(12) United States Patent
Pal et al.

(10) Patent No.: US 8,087,005 B2
(45) Date of Patent: Dec. 27, 2011

(54) SOFTWARE TESTING BY GROUPS

(75) Inventors: Kallol Pal, Bangalore (IN); Sanjeev K. Chaudhary, Bangalore (IN); Vinay Kumar Kolar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 11/876,742

(22) Filed: Oct. 22, 2007

(65) Prior Publication Data
US 2008/0046867 A1    Feb. 21, 2008

Related U.S. Application Data

(63) Continuation of application No. 09/783,250, filed on Feb. 14, 2001, now Pat. No. 7,363,618.

(51) Int. Cl.
*G06F 9/44* (2006.01)
(52) U.S. Cl. ......... 717/126; 717/124; 717/127; 717/130
(58) Field of Classification Search .................. None
See application file for complete search history.

(56) References Cited

U.S. PATENT DOCUMENTS

| | | |
|---|---|---|
| 5,355,479 A | 10/1994 | Torii |
| 5,729,676 A | 3/1998 | Inoue |
| 5,784,553 A | 7/1998 | Kolawa |
| 5,860,009 A | 1/1999 | Uchihira |
| 6,067,639 A | 5/2000 | Rodrigues |
| 6,173,440 B1 | 1/2001 | Darty |
| 6,343,375 B1 | 1/2002 | Gupta |
| 6,397,378 B1 | 5/2002 | Grey |
| 6,507,842 B1 | 1/2003 | Grey |
| 7,363,618 B2 * | 4/2008 | Pal et al. ............ 717/131 |

OTHER PUBLICATIONS

ATAC-Overview (chapter 3) published Jul. 15, 1998 (Google.com search).
U.S. Appl. No. 09/783,250, filed Feb. 14, 2001 (parent application JP920000411US1) Sep. 25, 2003 Mail Non-Final Rejection.
U.S. Appl. No. 09/783,250, filed Feb. 14, 2001 (parent application JP920000411US1) Dec. 26, 2003 Response after Non-Final Action.
U.S. Appl. No. 09/783,250, filed Feb. 14, 2001 (parent application JP920000411US1) Mar. 10, 2004 Mail Final Rejection (PTOL-326).
U.S. Appl. No. 09/783,250, filed Feb. 14, 2001 (parent application JP920000411US1) Aug. 18, 2004 Appeal Brief Filed.

(Continued)

*Primary Examiner* — Chuck Kendall
(74) *Attorney, Agent, or Firm* — Anthony England; William Steinberg

(57) ABSTRACT

A testing tool allowing convenient testing of programs and also classes in general. The tool automatically divides each program into many groups such that if one line (or statement) is executed it may reasonably be assumed that all the lines in the group are also executed. A tester is provided the ability to provide desired arguments (including class instances) and cause all groups to be executed such that all lines of code in the programs of a class are executed at least once. The groups are conveniently further logically combined into hierarchical blocks, with each block at a higher level corresponding to a logical structure such as if structure, for structure, while structure, etc. The blocks at the lowest level may contain a single group. Due to such hierarchy, a tester may visually easily identify the unexecuted blocks/groups. The tester may further define and execute small pieces of code (macros) in the middle of testing.

20 Claims, 20 Drawing Sheets

OTHER PUBLICATIONS

U.S. Appl. No. 09/783,250, filed Feb. 14, 2001 (parent application JP920000411US1) Dec. 7, 2004 Mail Final Rejection (PTOL-326).
U.S. Appl. No. 09/783,250, filed Feb. 14, 2001 (parent application JP920000411US1) Jan. 4, 2005 Amendment after Final Rejection.
U.S. Appl. No. 09/783,250, filed Feb. 14, 2001 (parent application JP920000411US1) Mar. 28, 2005 Supplemental Response.
U.S. Appl. No. 09/783,250, filed Feb. 14, 2001 (parent application JP920000411US1) Apr. 6, 2005 Mail Advisory Action (PTOL-303).
U.S. Appl. No. 09/783,250, filed Feb. 14, 2001 (parent application JP920000411US1) Jun. 2, 2005 Miscellaneous Incoming Letter.
U.S. Appl. No. 09/783,250, filed Feb. 14, 2001 (parent application JP920000411US1) Jun. 8, 2005 Mail Non-Final Rejection.
U.S. Appl. No. 09/783,250, filed Feb. 14, 2001 (parent application JP920000411US1) Oct. 7, 2005 Response after Non-Final Action.
U.S. Appl. No. 09/783,250, filed Feb. 14, 2001 (parent application JP920000411US1) Dec. 30, 2005 Mail Final Rejection (PTOL-326).
U.S. Appl. No. 09/783,250, filed Feb. 14, 2001 (parent application JP920000411US1) Jun. 5, 2006 Appeal Brief Filed.
U.S. Appl. No. 09/783,250, filed Feb. 14, 2001 (parent application JP920000411US1) Jul. 2, 2006 Amendment/Argument after Notice of Appeal.
U.S. Appl. No. 09/783,250, filed Feb. 14, 2001 (parent application JP920000411US1) Oct. 6, 2006 Mail Non-Final Rejection.
U.S. Appl. No. 09/783,250, filed Feb. 14, 2001 (parent application JP920000411US1) Mar. 6, 2007 Appeal Brief Filed.
U.S. Appl. No. 09/783,250, filed Feb. 14, 2001 (parent application JP920000411US1) Jul. 3, 2007 Mail Notice of Allowance.

* cited by examiner

```
public void addString(String inStr) {
    /* The location where the string needs to be set */
    int setPos = -1;
        /* Check the size to see if the next set needs to be allocated */
    if( list.size() > 0 && (
(String)(list.elementAt(list.size()-1))).equals(emptyString) ) {
            /* We still have empty space, get the first empty slot */
            int totalRec = list.size();
            for(int index=totalRec-1;index >= 0;index--) {
                if(!((String)list.elementAt(index)).equals(emptyString)) {
                    break;
                }
                else {
                    setPos = index;
                }
            }
    }
    else {
            /* We have run out of space, allocate the nest set */
            int size = list.size();
            for(int index=0;index<numSetVal;index++) {
                list.addElement(emptyString);
            }
            setPos = size;
    }

/* Add the element */
    list.setElementAt(inStr,setPos);
}
```

Figure 4A

```
public void addString(String inStr) {
    /* INTRUMENTATION Group B11 - BEGIN */
    Wiz_Tracer.trackExecution("WizStringList",11);
    /* INTRUMENTATION GROUP B11 - END */
    int setPos = -1;
    if( list.size() > 0 && (
(String)(list.elementAt(list.size()-1))).equals(emptyString) )
{/*INTRUMENTATION GROUP B12 - BEGIN */
        Wiz_Tracer.trackExecution("WizStringList",12);
        /* INTRUMENTATION GROUP B12 - END */
        int totalRec = list.size();
        for(int index=totalRec-1;index >= 0;index--) {
            /* INTRUMENTATION GROUP B13 - BEGIN */
            Wiz_Tracer.trackExecution("WizStringList",13);
            /* INTRUMENTATION GROUP B13 - END */
            if(!((String)list.elementAt(index)).equals(emptyString)) {
                /* INTRUMENTATION GROUP B14 - BEGIN */
                Wiz_Tracer.trackExecution("WizStringList",14);
                /* INTRUMENTATION GROUP B14 - END */
                break;
            }       /* <if GROUP(B14) ends at line : 134> */
```

Figure 4B

```
        else {    /* <else GROUP(B15) begins at line : 135> */
                  /* INTRUMENTATION GROUP B15 - BEGIN */
                  Wiz_Tracer.trackExecution("WizStringList",15);
                  /* INTRUMENTATION GROUP B15 - END */
                  setPos = index;
        }         /* <else block(B15) ends at line : 138> */
                  /* <break(B16) begins at line : 139> */
                  /* INTRUMENTATION GROUP B16 - BEGIN */
                  Wiz_Tracer.trackExecution("WizStringList",16);
                  /* INTRUMENTATION GROUP B16 - END */
            }     /* <for block(B13) ends at line : 139> */
        }         /* <if block(B12) ends at line : 141> */
        else {    /* <else block(B17) begins at line : 142> */
                  /* INTRUMENTATION GROUP B17 - BEGIN */
                  Wiz_Tracer.trackExecution("WizStringList",17);
                  /* INTRUMENTATION GROUP B17 - END */
                  int size = list.size();
                  for(int index=0;index<numSetVal;index++) {    /* <for
                                block(B18) begins at line : 146> */
                        /* INTRUMENTATION GROUP B18 - BEGIN */
                        Wiz_Tracer.trackExecution("WizStringList",18);
                        /* INTRUMENTATION GROUP B18 - END */
                        list.addElement(emptyString);
                  }     /* <for block(B18) ends at line : 149> */
                  setPos = size;
        }         /* <else block(B17) ends at line : 152> */
        list.setElementAt(inStr,setPos);
}         /* <method block - addString(B11) ends at line : 156> */
```

Figure 4C

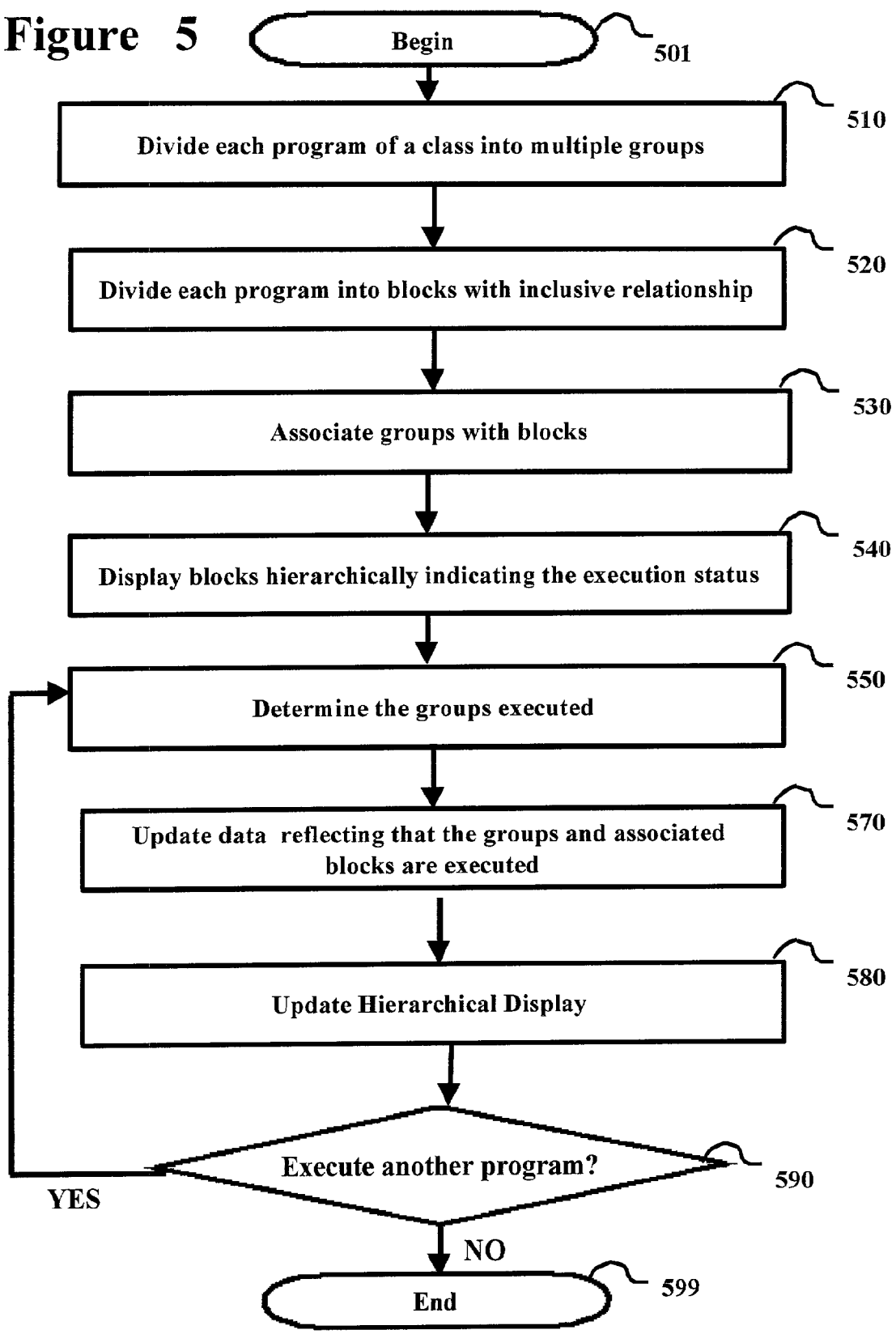

SOFTWARE TESTING BY GROUPS

CROSS REFERENCE TO RELATED APPLICATION

This is a continuation of, and hereby claims the benefit of the priority date of, application Ser. No. 09/783,250 of Feb. 14, 2001.

BACKGROUND OF THE INVENTION

1. Field of the Invention

The present invention relates to software testing, and more specifically to a method and apparatus for testing entities such as programs and classes used in object oriented environments.

2. Related Art

A program generally refers to a set of instructions which are written according to a convention specified by a corresponding programming language. Typical programming languages define structures such as program delimiters (e.g., program begin and end), control structures (e.g., if . . . else structure), and loops (e.g., for, while, until structures) using which a developer can develop programs. The programs when executed on a data processing system provide a desired feature.

Programs are often part of what are referred to as classes in object oriented environments (e.g., based on Java programming language). Classes generally contain data structures and associated programs as is well known in the relevant arts. For conciseness, the description below is provided substantially with reference to classes. However, several aspects of the present invention may be implemented outside of object oriented environments.

There has been recognized a need to test classes typically before being used in production environments. Testing generally refers to identifying any problems (defects) in the developed classes. Thus, usually a tester tests the developed objects using testing tools after a developer has developed the programs and/or classes of interest. To facilitate the identification of problems with developed classes, a testing tool may need to support several features.

One desired feature of testing is to ensure that all lines of code are executed at least once so that there can be some level of confidence that a class operates in an intended manner. In one prior approach referred to as 'stub and driver' approach, a developer typically designs drivers (a piece of code) which can be used by a tester to invoke different programs on the class being tested with different arguments. The class being tested may invoke other programs on other classes which may not yet be available to the tester. The tester often writes some dummy code to simulate such missing classes that can then be used to test the class of interest. The dummy code is referred to as a stub.

A tester may not be able to determine whether all lines of code of a program are executed using the stub and driver approach usually because of absence of mechanisms to determine whether each line has been executed. In addition, the overhead (usually on the developer) in maintaining the stubs and drivers may not be acceptable in several environments. Accordingly, what is needed is a method and apparatus which enables an easy determination of whether all the program lines of a class have been executed at least once during testing.

Another desirable feature of testing is the ability to provide different argument values (parameters) to each program contained within a class. A tester may use such a feature, for example, to control the program flow or to test a program with different arguments. One type of argument of particular interest is the ability to pass an instance of a class since such a feature simplifies testing of scenarios when an instance of a class is to be provided as an argument to another class.

Yet another desirable feature of testing is the ability to quickly execute pieces of code, not part of the classes being tested, in the middle of testing classes. Such a feature may be used, for example, to examine or store the state of different variables contained within an instance of a class.

SUMMARY OF THE INVENTION

An aspect of the present invention enables a tester to ensure that all statements (program lines) of programs are executed at least once. Each program is divided into potentially multiple groups, with each group containing a sequence of statements such that a tester can be certain that all statements of a group are executed if one statement of the group is executed. The program can be a part of a class sought to be tested.

The executed groups are determined as a tester continues testing a class of interest. In one embodiment, an extra statement is inserted into each group automatically by a testing system such that the execution of the extra statement(s) can be readily detected. An identifier is also associated with each group and the extra statement may include a mechanism to indicate that the extra statement has been executed by using the identifier. Accordingly, the identifier can be examined to determine the specific group that has been executed. The unexecuted groups are indicated using a suitable interface such that the tester can cause the unexecuted groups also to be executed.

Another aspect of the present invention provides a convenient user interface using which a tester can conveniently be shown the status of execution of different groups. Several groups are logically grouped into a block. A block is shown as being executed only if all the corresponding (contained) groups are also executed. In an embodiment, the blocks are determined according to the programming language structures employed in coding the programs. Typical language structures include program delimiters (i.e., program begin and end), control structures (e.g., if . . . else structures), and loop structures (e.g., for, while, until structures). Thus, all groups within a program structure are grouped as block.

When language structures are present in other language structures, the corresponding blocks are defined with a parallel hierarchy. Thus, a block at a higher level of hierarchy may contain several blocks of lower level hierarchy, and a block at the lowest level corresponds to a group. Using such a hierarchical definition, the status of execution of blocks is made to parallel the logical coding of the programs, and thus make it easier for a tester to quickly appreciate where unexecuted blocks are present and how they can be caused to be executed.

One more aspect of the present invention enables a tester to provide desired values for arguments of programs. The values may be chosen to control the execution flow to ensure all groups are executed. In addition, it may be desirable to execute programs with different argument values.

Yet another aspect of the present invention enables a tester to instantiate classes and pass the resulting instances as an argument value. The instance may be given a name and the name is used to specify the instance as an argument. According to one convention, any entered string is examined for a match with the already instantiated instance names, and an instance is deemed to be intended if the entered string matches the corresponding name.

Another aspect of the present invention allows a tester to define small pieces of code, termed as macros, and execute the macros in the middle of testing. That is, between initiating the execution of programs, the macros may be selected and executed. The macros may be used, for example, to display the status of various variables within an instance of a class. In general, macros provide a tester the ability to address specific scenarios which are unique in that instance.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 4A contains the program lines of an example program used to illustrate the manner in which the program may be divided into groups;

FIGS. 4B and 4C depict the additional program lines inserted into the program of FIG. 4A illustrating the manner in which the execution of different blocks can be determined in an embodiment of the present invention;

FIG. 5 is a flow chart illustrating the manner in which the status of execution of different groups/blocks may be displayed in an embodiment of the present invention;

DETAILED DESCRIPTION OF THE PREFERRED EMBODIMENTS

1. Overview and Discussion of the Invention

A testing program provided according to an aspect of the present invention divides each program in a class into multiple groups, with each group containing a sequence of program lines such that one can be certain that all the program lines of the group will be executed if one of the lines is executed, but for the occurrence of some abnormal condition. As a tester tests the programs in the classes, the testing program keeps track of the groups which have been executed. By ensuring at least one statement in all groups is executed, the tester can ensure that all lines in the programs are executed at least once.

Another aspect of the present invention provides a convenient user interface using which a tester can readily appreciate the not-yet-executed ("unexecuted") groups, and cause the corresponding groups also to be executed. The groups are in turn grouped according to the language structures (e.g., loop structure, control structure). Thus, a block may correspond to each language structure. When a lower level language structure is contained in a higher level structure, blocks with similar relationship are defined. The blocks at the lowest level may correspond to groups themselves.

According to another aspect of the present invention, the testing program enables a tester to manually provide various argument values of interest to programs of a class being tested. The argument values may be provided, for example, to control the execution flow within a program so as to ensure that all groups are executed at least once. The arguments can generally be of any type, including instances of classes. As a result, a tester may ensure that a desired group is executed by passing arguments which cause execution of the group.

One more aspect of the present invention provides a simplified user interface using which a tester may quickly implement (e.g., write) a small piece of code and execute the code in between the programs. The code may be executed, for example, to examine the status of various instances of objects. In general, macros provide a tester the ability to address specific scenarios which are unique in that instance.

The invention is described below with reference to Java environment for illustration. In general, several aspects of the present invention can be implemented with any structured programming language (e.g., C++). It should be further understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
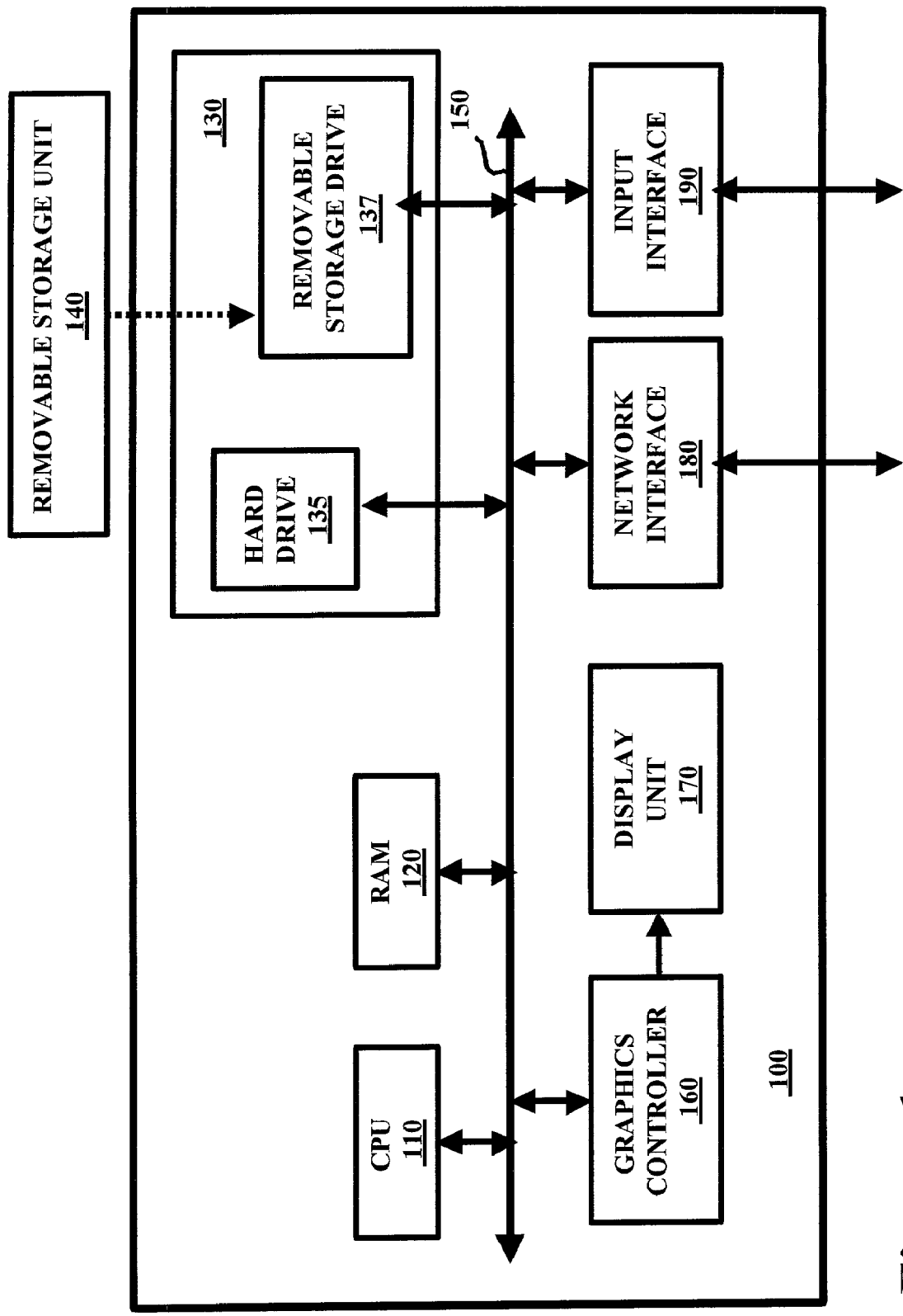
FIG. 1 is a block diagram illustrating an example system in which the present invention can be implemented.

FIG. 1 is a block diagram of computer system 100 illustrating an example environment for implementing the present invention. Even though computer system 100 is described with specific components and architecture for illustration, it should be understood that the present invention may be implemented in several other types of embodiments. For example, the invention can be implemented on multiple cooperating networked computer systems. In addition, each component can be implemented as a combination of one or more of hardware, software and firmware, even though many features of the present invention are described herein as being implemented in software.

Computer system 100 may contain one or more processors such as central processing unit (CPU) 110, cache 115, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention. CPU 110 may contain one or more individual processors. RAM 120 may receive instructions from secondary memory 130 using communication path 150. Data may be stored and retrieved from secondary memory 130 during the execution of the instructions.

Graphics controller 160 generates display signals (e.g., in RGB format) to display unit 170 based on data/instructions received from CPU 110. Display unit 170 contains a display screen to display the images defined by the display signals. Input interface 190 may correspond to a key-board and/or mouse, and generally enables a tester to provide inputs. Network interface 180 enables computer system 100 to communicate with other systems using protocols such as TCP/IP.

Secondary memory 130 may contain units such as hard drive 135 and removable storage drive 137. Secondary storage 130 may store the software instructions and data, which enable computer system 100 to provide several features in accordance with the present invention. Some or all of the data and instructions may be provided on removable storage unit 140, and the data and instructions may be read and provided by removable storage drive 137 to CPU 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer usable storage medium having stored therein computer software and/or data. An embodiment of the present invention is implemented using software running (that is, executing) in computer system 100. In this document, the term "computer program product" is used to generally refer to removable storage unit 140 or hard disk installed in hard drive 135. These computer program products are means for providing software to computer system 100.

The features of the present invention are described below first with reference to flow charts, then with a software architecture, and finally with reference to example user interfaces.

3. Method to Ensure Coverage in Testing

Figure 2:
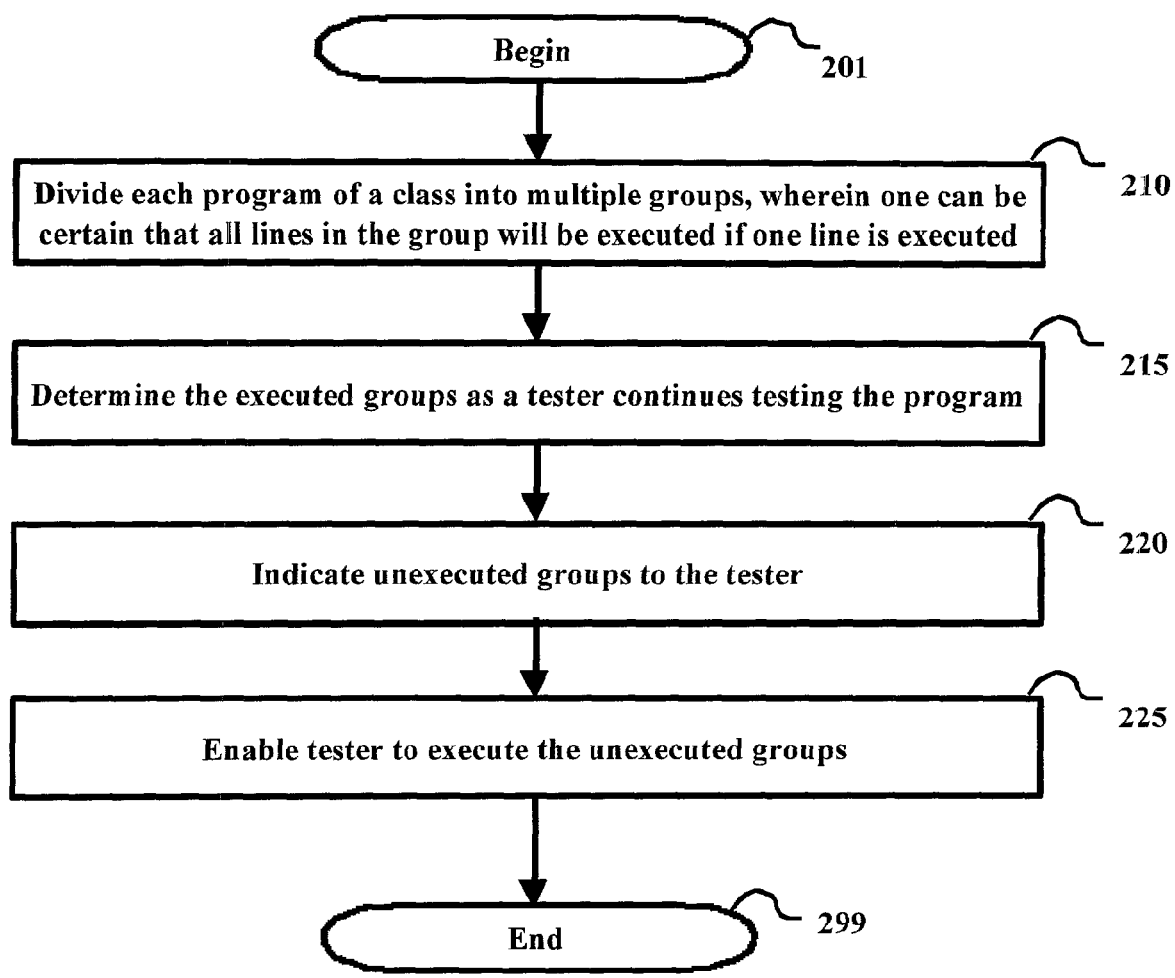
FIG. 2 is a flow chart illustrating a method in accordance with the present invention using which a tester can ensure that all lines of programs in a class are executed at least once.

FIG. 2 is a flow chart illustrating the details of a method in accordance with the present invention. The method begins in step 201, in which control immediately passes to step 210. In step 210, computer system 100 divides each program in a target class (i.e., class to be tested) into multiple groups covering the entire program. If one instruction of a group is executed it may be reasonably assumed that all instructions of the group are executed unless some abnormal condition occurs.

In step 215, computer system 100 determines the executed groups as the tester continues executing programs for testing purpose. In an embodiment described below, computer system 100 embeds program lines in each group so that the embedded lines indicate that the group has been executed when the embedded lines are executed. While the lines in the embodiment may be executed along with the program lines in potentially the same thread (or process) different mechanisms may be used to provide the an indication of the execution of the embedded lines. Examples of such mechanisms include simple print statements and inter-process communication (such as sockets) well known in the relevant arts.

In step 220, computer system 100 indicates the unexecuted groups to the tester. Various approaches (e.g., simple display of a list of unexecuted groups) can be undertaken to indicate the unexecuted groups. In an embodiment described below, the program is shown divided into blocks organized hierarchically, with a block at a higher level logically containing potentially several lower level blocks. A block at a higher level is deemed to be executed only if the lower level blocks are executed.

In step 225, computer system 100 enables the tester to control execution flow by providing desired values as arguments such that the unexecuted groups can be executed. An argument type of particular interest is an instance of an object since the data structures in instances can be extensive and complex. An example architecture implemented within computer system 100 which can implement the method of FIG. 2 is described below with reference to FIG. 3.

4. Example Architecture

Figure 3:
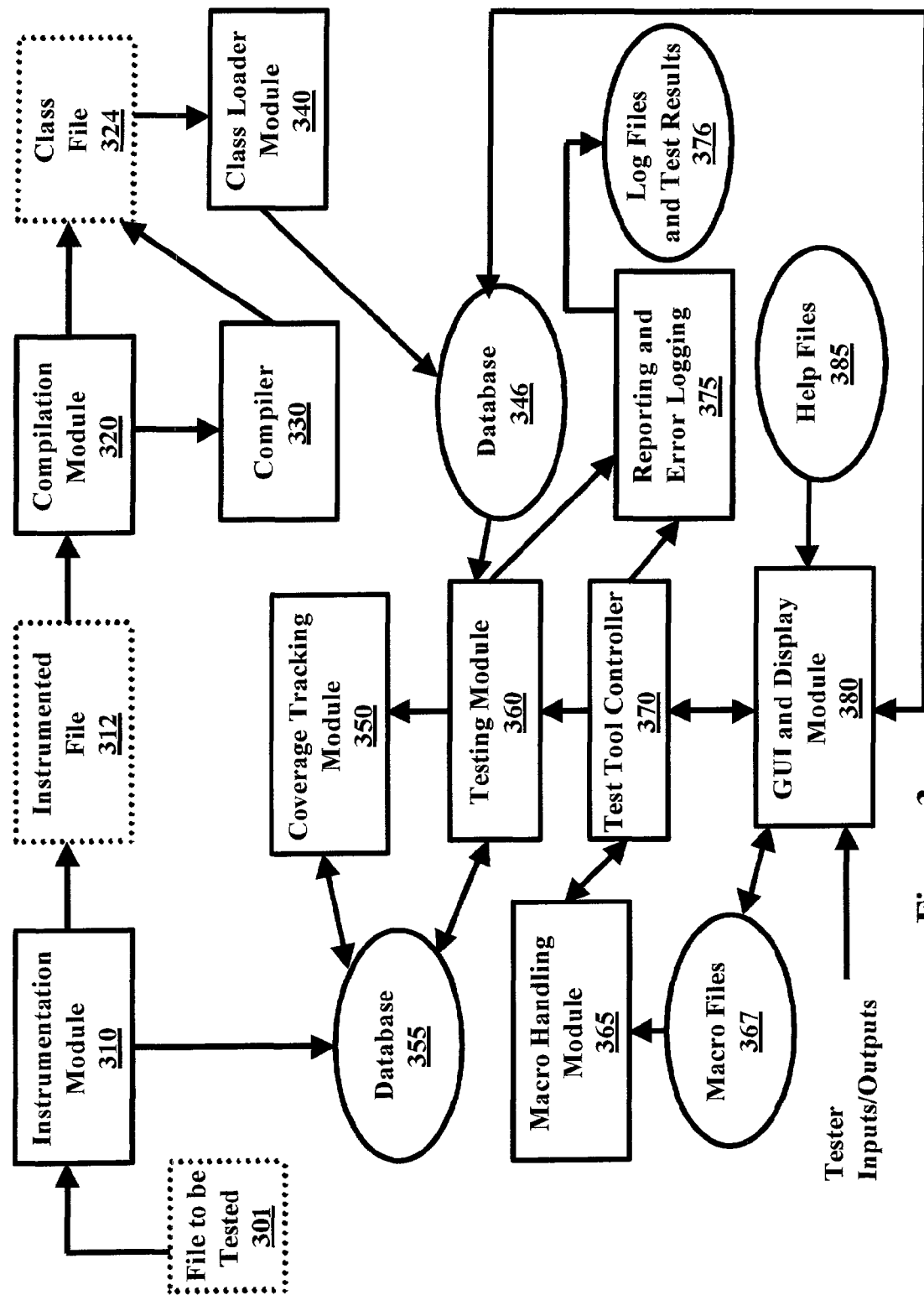
FIG. 3 is a block diagram of an embodiment of computer system 100 illustrating an example architecture for implementing various aspects of the present invention.

FIG. 3 is a block diagram of an embodiment of computer system 100 illustrating an example architecture for implementing various aspects of the present invention. Computer system 100 is shown containing instrumentation module 310, compilation module 320, JAVAC-compiler 330, class loader module 340, coverage tracking module 350, testing module 360, macro handling module 365, test tool controller 370, and GUI and display module 380. The data (stored in non-volatile memories or volatile memories) are shown as ellipses and the files generated or operated on are shown as rectangles with broken lines. Each component of FIG. 3 is described below in further detail.

Database 355 generally contains a non-volatile memory (implemented, for example, using secondary storage 130) enabling the storing of data, and associated software enables the data to be stored and retrieved in a structured matter usually in the form of queries.

Instrumentation module 310 inserts statements into each group such that the execution of the corresponding groups can be conveniently ascertained. A unique identifier may be associated with each group, and the association information is communicated to group information and coverage database 355. Instrumented java file 312 represents the output of instrumentation module 310. The operation of instrumentation module 310 is illustrated below with an example with reference to FIGS. 4A and 4B.

Compilation module 320 compiles instrumented file 312 using JAVAC-compiler 330 (available from Sun Micro Systems) to generate class file 324. Class file 324 contains Java byte codes well known in the relevant arts. Class loader module 340 loads the classes in class file into memory 346, which may be implemented in RAM 120. Memory 346 stores data representing various instances of the loaded classes.

Once the environment is setup as described above, the components of FIG. 3 described below enable classes in class file 324 to be tested. The operation and implementation of these components will be further clarified with reference to the user interfaces described in the sections thereafter.

GUI and display module 380 provides a user interface using which a tester may test different classes provided in class file 324. An example graphical user interface with respect to several features of the present invention is described below in further detail. Help files 385 represent various files which may be used to provide a tester with online help information.

Test tool controller 370 interfaces with GUI and display module 380, and controls the operations of testing module 360, macro handling module 365, and reporting and error logging module 375. That is depending on the commands issued by a tester, the operation of different modules may be initiated with the appropriate parameters.

Testing module 360 executes the programs specified by test tool controller 370. The executed programs include the additional lines of code inserted by instrumentation module 310. In addition, test tool controller 370 enables a tester to execute small pieces of programs, termed as macros, by interfacing with macro handling module 365.

Coverage tracking module 350 updates the group information in group information and coverage database 355 reflecting that the corresponding groups have been executed. The code included in Appendix A may be used for at least a part of such purpose. In an embodiment, the stored information merely reflects whether each group has been executed at least once or not.

Macro handling module 365 allows a tester to execute a macro stored in macro files 367. Macro files 367 may be implemented using secondary storage 130. The macros may be defined by a tester using GUI and display module 380. Reporting and error logging module 375 interfaces with test tool controller 370 and testing module 360, and logs the various errors in log files and test results database 376.

The description is continued first with reference to instrumentation noted above, and then with reference to example user interfaces which provide various features of the present invention.

5. Instrumentation

FIG. 4A contains lines of a program of a class presented in file 301, and FIGS. 4B and 4C contain the lines of the corresponding instrumented file 312. FIG. 4A contains the code of a program titled 'addString'. The program accepts a string as an argument. FIGS. 4B and 4C contains additional program lines inserted. Instrumentation module 310 may insert comments also as illustrated.

Thus, the program of FIG. 4A is separated into 6 groups numbered, B11-B16 (group identifiers) as shown in FIGS. 4B and 4C. In the described embodiments, a group may contain physically non-contiguous lines of code so long as all the lines in the group would be executed if one of the lines would be executed. Thus, line 27 of FIG. 4A may be viewed as being part of the group identified by B11.

Instrumentation module 310 may insert program statements, with each statement containing class name and group identifier as parameters into program code as depicted, for example, in lines 3, 9, 14, 18 of FIG. 4B. While only one program statement is shown inserted for each group, more than one statement also can be inserted as a designer wishes.

The effect of the inserted program statement is to pass the group identifier in the statement to coverage tracking module 350 when the statement is executed. An example implementation of the inserted program statement is contained in Appendix A.

Accordingly, database 355 may be updated to keep track of the groups which have and have not been executed. It is further desirable that the information be presented in a easily understandable manner to the tester so that the tester can ensure that all groups are executed at least once. An example approach to providing a convenient user interface is described below.

6. Convenient Execution of All Blocks

FIG. 5 contains a flow chart illustrating a method using which computer system 100 may enable a tester to conveniently know the status of different groups and cause the unexecuted groups to be executed. The steps are described with reference to the components of FIG. 3 for convenience. The method may be practiced in other environments as well.

The method starts in step 501, in which control immediately passes to step 510. In step 510, instrumentation module 310 may divide each program of a target class into multiple groups (similar to in step 210).

In step 520, instrumentation module 310 may divide each program into blocks, with each block containing one or more groups. The blocks may have a hierarchical relationship, with blocks at a higher level potentially containing one or more blocks at a lower level. Several levels of hierarchy may be present in a program as illustrated below with reference to FIG. 6.

In step 530, instrumentation module 310 associates each block with the corresponding group(s). By associating the groups with the blocks, the tester may be conveniently presented execution status in terms of blocks in a hierarchical fashion. While steps 520 and 530 are described as distinct steps, typically both steps are performed in parallel while the program code is parsed and examined.

In step 540, GUI and display module 380 displays the blocks in a hierarchical fashion. The display may begin after the class is loaded. The status of execution of each block may be indicated. The execution of higher level blocks may be deemed to be complete only if all the corresponding lower level blocks are executed.

In step 550, the execution of the programs may be monitored to determine the group(s) which are executed. The data in database 355 may be updated to reflect any newly executed groups. In turn, the executed blocks may also be determined. In step 570, the data in database 355 may be updated to reflect the execution of any unexecuted group(s).

In step 580, GUI and display module 380 may update the hierarchical display of blocks reflecting the status of different executed and unexecuted blocks (by implication groups). In step 590, test tool controller 370 may determine whether the tester wishes to execute another program. Control is transferred to step 550 if another program is to be executed, or else control transfers to step 599 where the execution ends.

The hierarchical display noted in step 540 and 570, and the manner in which a tester may execute programs are described below with examples.

7. Hierarchical Display

As noted above, the hierarchical display may begin after a class is loaded. Thus, a tester may use GUI and display module 380 to indicate that the class in class file 324 is to be loaded. In response, test tool controller 370 may interact with class loader module 340 to cause the indicated class to be loaded. Loading generally causes the Java byte code to be loaded into RAM 120. Once the class is loaded, the corresponding hierarchical display may be shown as illustrated with reference to FIG. 6.

Figure 6:
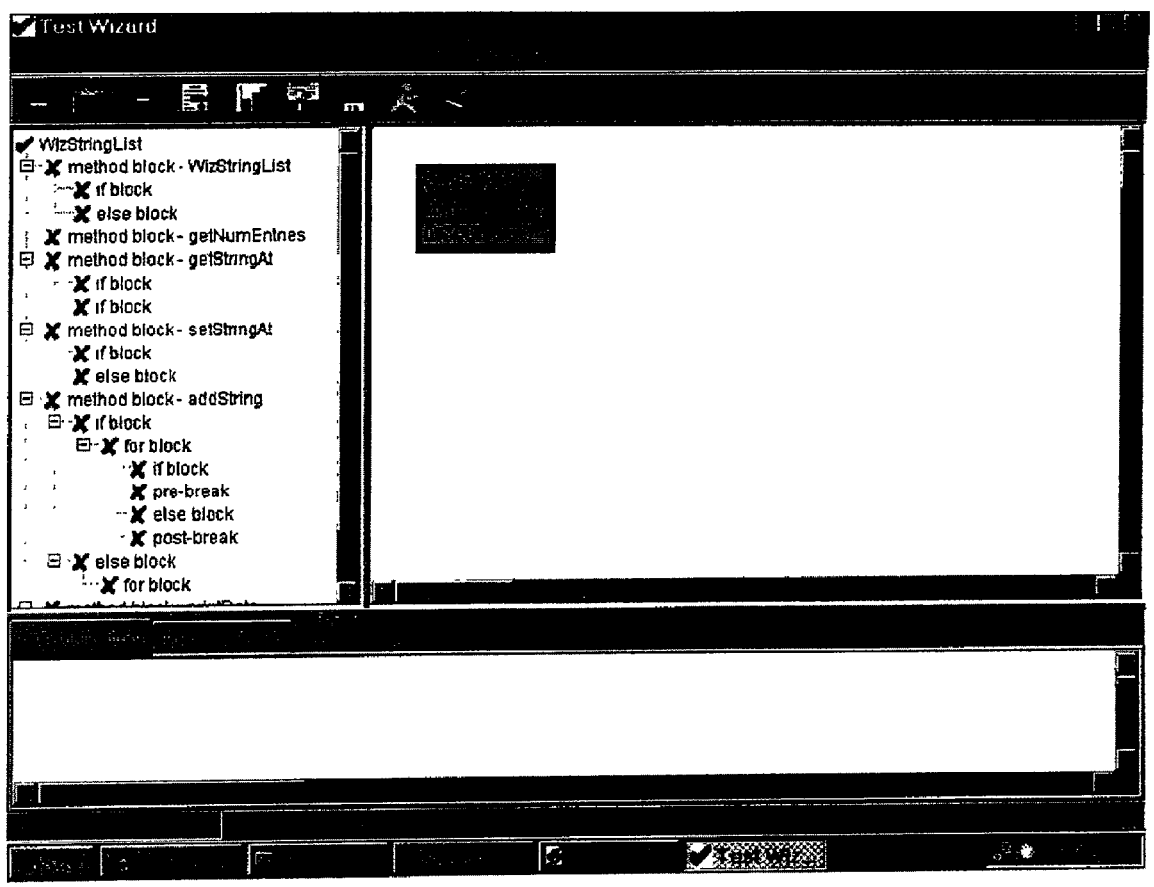
FIG. 6 is a snapshot of a screen illustrating the manner in which the status of the blocks/groups of the program contained in FIG. 4A may be displayed.

FIG. 6 is a snapshot of a screen (e.g., generated on display unit 170) illustrating the manner in which GUI and display module 380 may display the status of the blocks/groups of the program contained in FIG. 4A. It should be appreciated that the blocks are organized according to the language structures employed in coding the programs. At the first level of the hierarchy are the program delimiters (specifying the begin and end of the programs). There are the blocks corresponding to the if structure (an example of a control structure). There are also shown blocks corresponding to the loop structure (e.g., for).

The screen depicts 'method block-addString' (a block for the program) at the highest level of hierarchy in WizString-List (a class). It is noted that the term method is often used in lieu of program in Java environment, and thus the Figures are shown using the term 'method' instead of 'program'.

At the second level of hierarchy within the AddString block, an if block (corresponding to IF statement on lines 5 and 6 of FIG. 4A) and an else block (corresponding to the ELSE statement in 18 are shown). At a third level of hierarchy within the if block, only a for block (corresponding to line 9 of FIG. 4A) is shown. At a fourth level of hierarchy, the for block is shown containing if block (starting at line 10 of FIG. 4A), pre-break block (if the I condition of line 10 if true), else block (line 14).

Each block in turn is associated with one or more groups. Each block at the lowest level is associated with only one group. Thus, groups with identifiers 13 (line 14 of FIG. 4B), 14 (line 18 of FIG. 4B), 15 (line 23 of FIG. 4C) are respectively associated with if block, pre-break block and else block within the for block of FIG. 6. The higher level blocks may also be associated with a group. Thus, the for block may be associated with group identifier 13.

A block at the lowest level is deemed to be executed when the corresponding group is executed. A higher level block is deemed to be executed only if any associated block is and all the corresponding lower level blocks are executed. For example, the 'for block' in AddString block would be deemed to be executed only if the four sub-blocks (if, pre-break, else, and post-break blocks) are executed and group with identifier 13 is also executed.

The status of execution of each block is indicated by a cross ('x') mark (not executed case) or a check ('✓') mark (executed). The tester may click on the '−' or '+' sign associated with each higher level block would toggle between showing and not showing the lower level blocks. Thus, once the execution of a higher level block is complete, the tester may not have motivation in examining the status of lower level blocks. As a result, the detail is conveniently hidden from the tester, making the user interface more convenient.

Using the hierarchical display of above, an example user interface using which the tester may first instantiate a class and then test the class, is described below.

8. Instantiating a Class

Figure 7A:
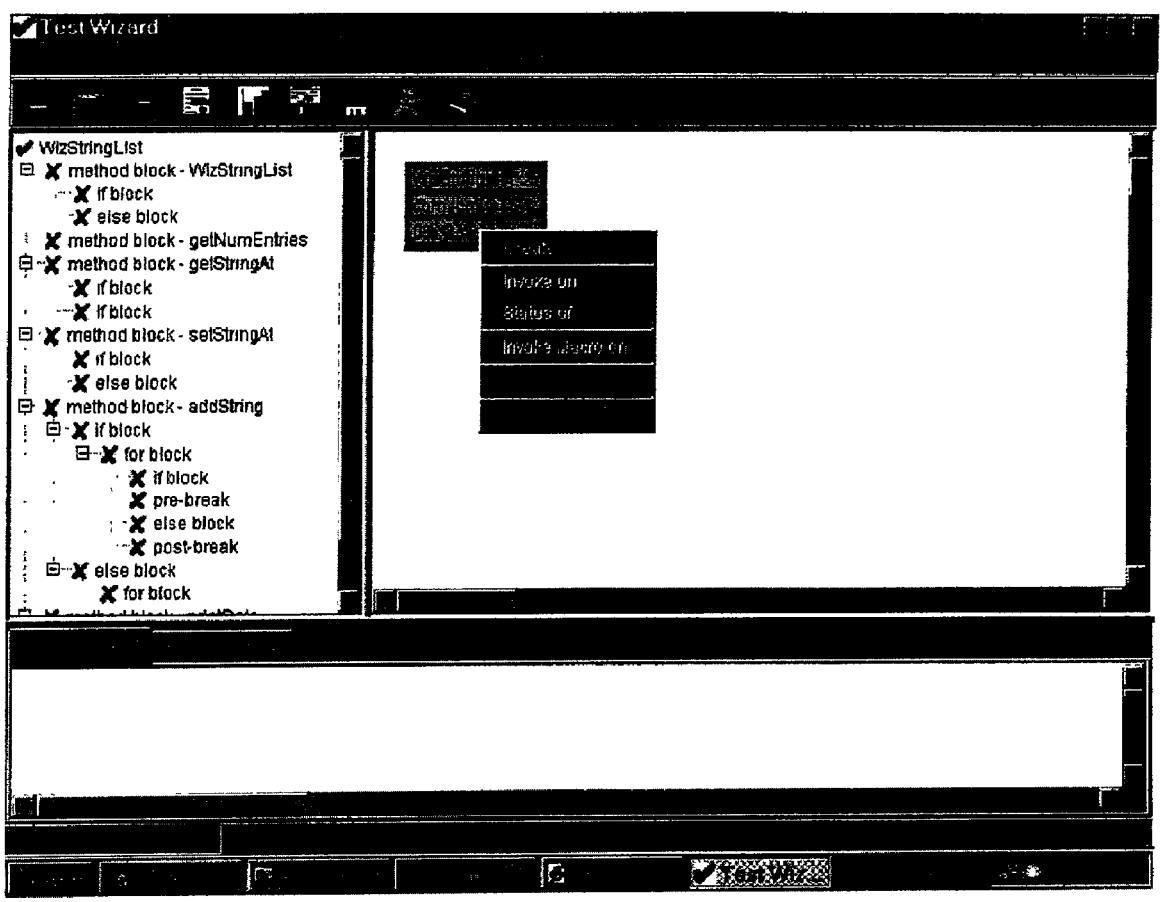
FIG. 7A is a snapshot of a screen illustrating an example user interface for instantiating an object prior to testing.

The tester may need to first instantiate an instance of a class before starting testing. FIG. 7A depicts an example user interface for instantiating a class. The tester selects the class to be instantiated and then causes a menu to be displayed by using a right click when the mouse is on the Class icon. The tester then selects the 'create' option.

Figure 7B:
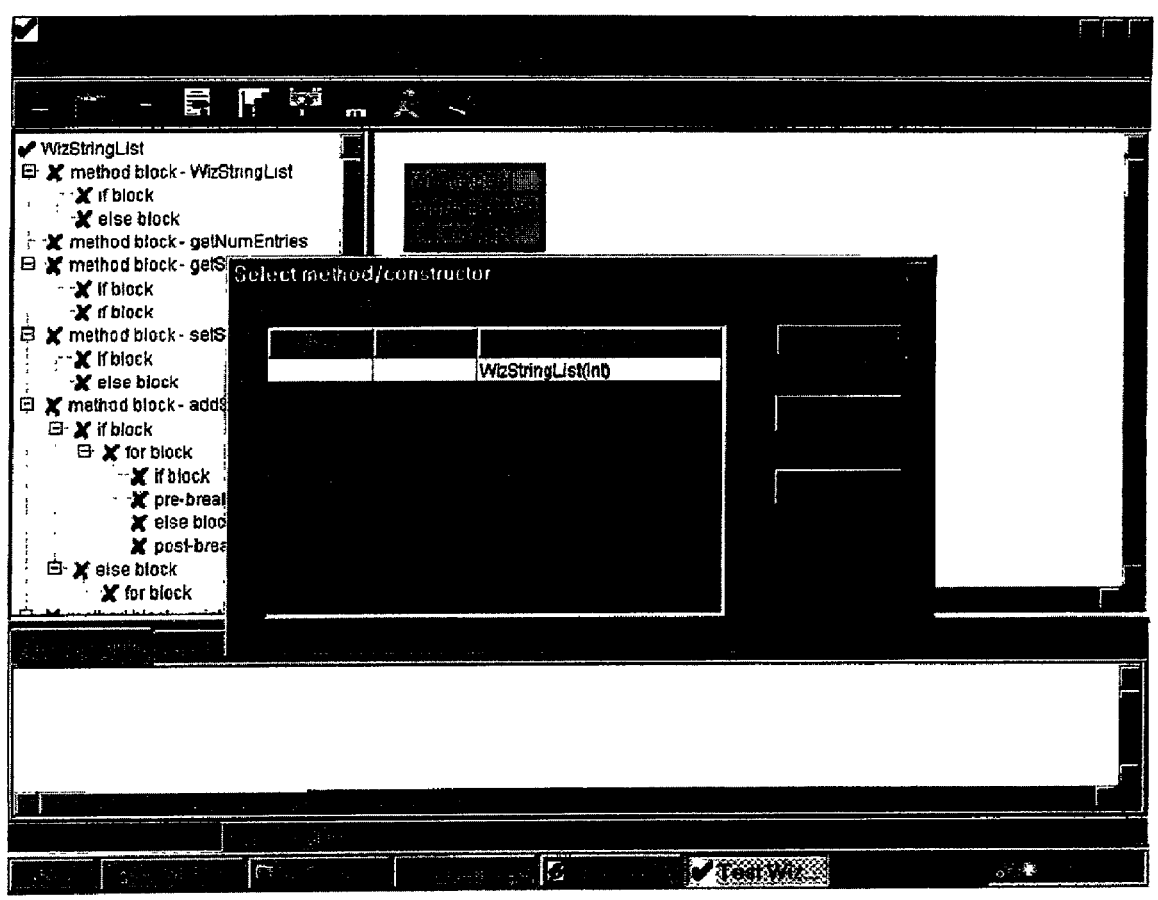
FIG. 7B illustrates the manner in which a tester may select a constructor when instantiating a class.

Control may then be automatically be transferred to FIG. 7B, in which the tester may select a constructor which instantiates the class. More than one constructor may be present, and the tester selects one of the constructors. The operation and implementation of constructors may be implemented in a known way. Once the constructor is selected, the selected class is instantiated.

Figure 7C:
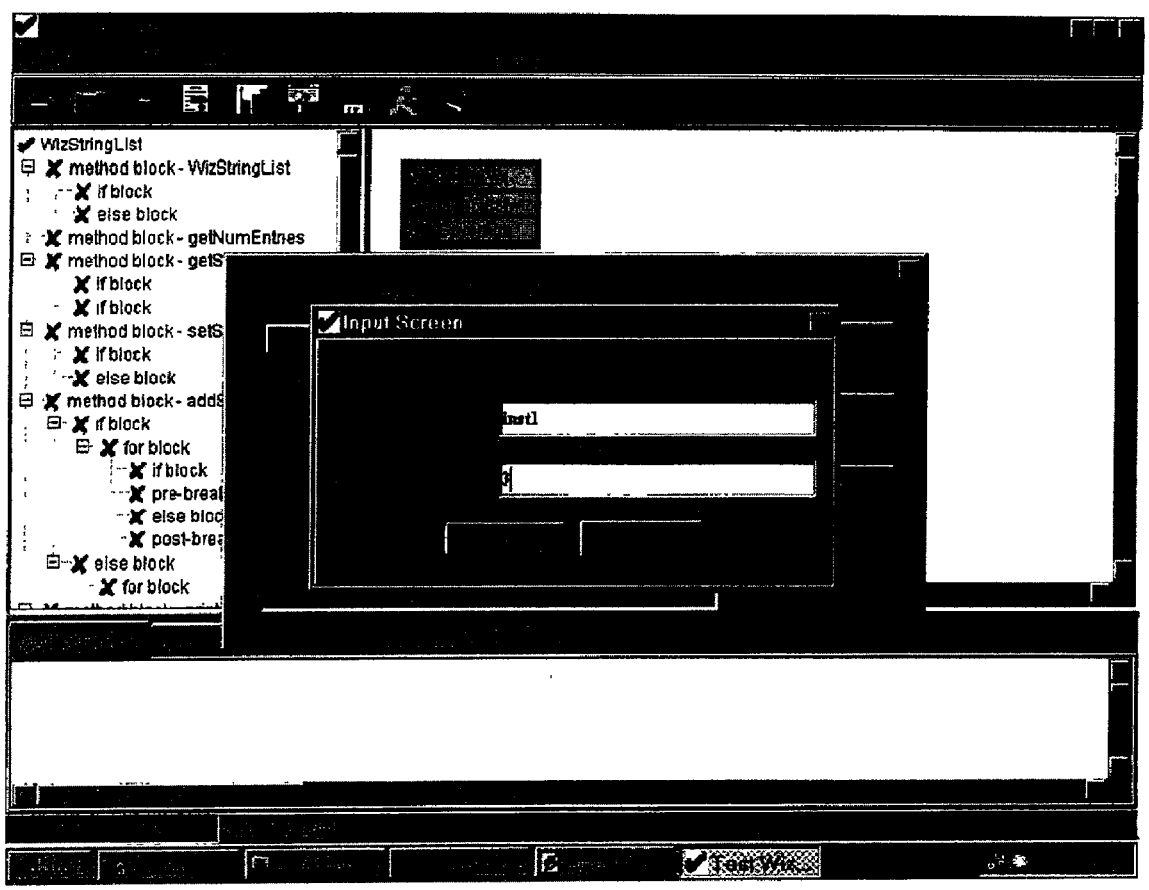
FIG. 7C illustrates the manner in which a tester may specify the name and argument values while instantiating a class.

The tester may be provided the option of specifying the name (inst1) and the argument(s) of the instance as depicted in FIG. 7C. Multiple instances may be instantiated for a class. In an embodiment, the instances across all classes being tested need to be unique.

The hierarchical display for the class is depicted in FIG. 6 once a class is loaded. The tester may then examine each program within an instantiated class and cause all the blocks to be executed. The tester may first determine the arguments which would cause an unexecuted block to be executed, and then execute the program with the determined arguments as described below in further detail.

9. Determining Arguments which would Cause Unexecuted Block to be Executed

The approach to be described is generally referred to as 'white box testing' as the tester needs to be aware of the program code to ensure execution of all the groups (program lines). GUI and display module 380 enables a tester to examine the code (program lines) of a block by selecting the block. The tester may then determine the arguments which would cause the unexecuted groups to be executed.

Figure 8:
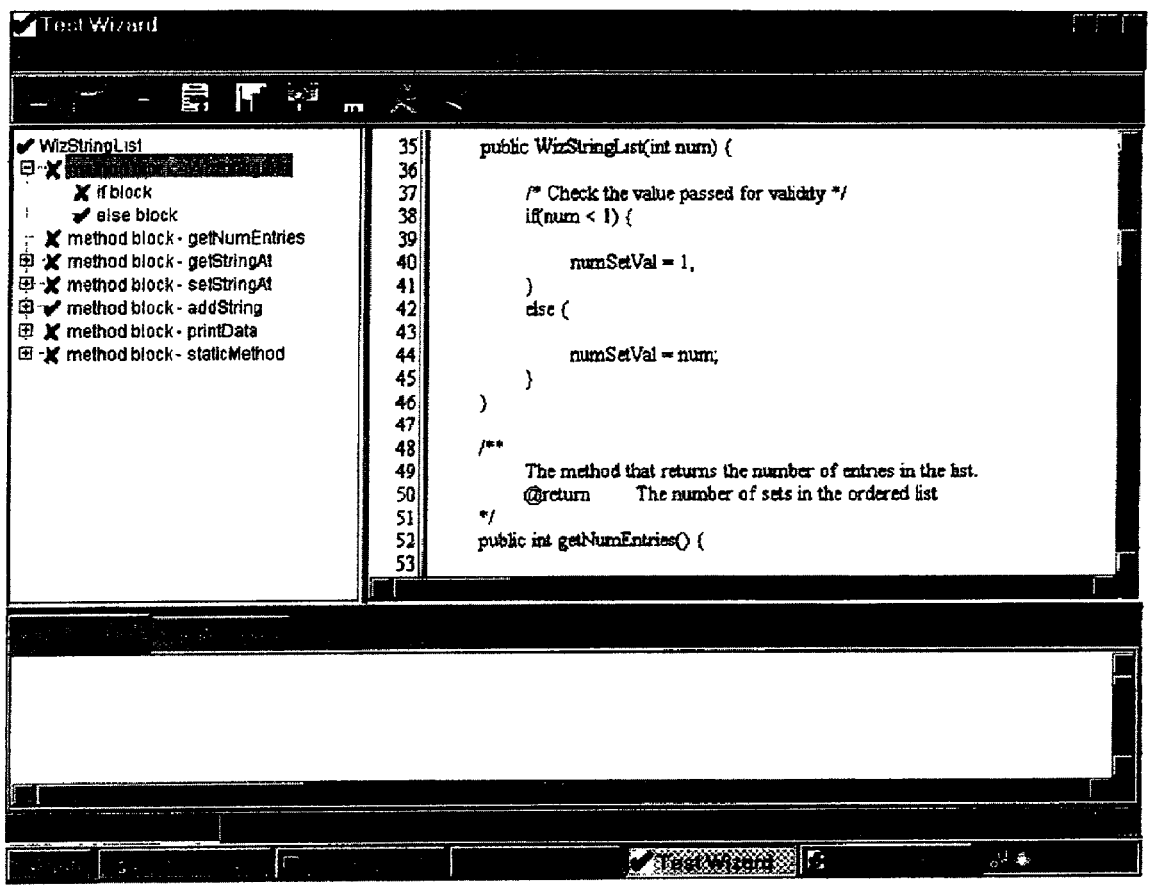
FIG. 8 is a snapshot of a screen illustrating the manner in which a tester may examine the program lines to determine the argument values to pass to cause unexecuted blocks to be executed.

FIG. 8 is a snap-shot of a screen illustrating an example manner in which GUI and display module 380 enables a tester to view the code corresponding to the blocks. Only the pre-instrumented code is displayed for the convenience of the tester. There is shown a situation in which the if block (of WizStringList) has not yet been executed, and the else block has been executed.

The tester accordingly selects (shown with grey highlighting) the WizStringList block. The corresponding code is displayed in the display portion. The lines of code which are executed may be shown in one color and the unexecuted lines may be shown in another color (e.g., red). The tester may readily observe that the unexecuted else block may be executed by passing a number less than 1 as an argument to WizStringList program. The tester may then execute the program with the determined parameter(s) as described below.

10. Executing a Program with Desired Arguments

Figure 9A:
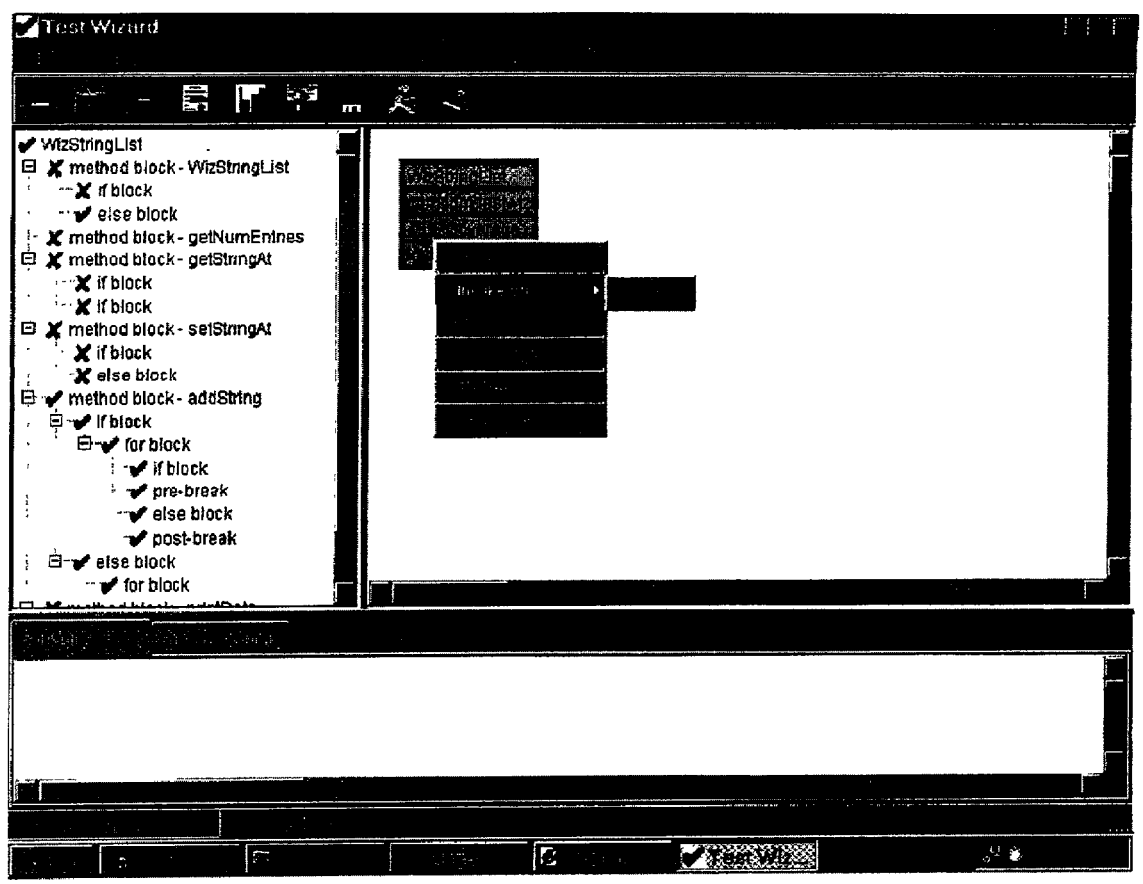
FIG. 9A is a snap-shot on a display screen illustrating the manner in which a tester selects a specific instance of an object on which a program may be later executed.

FIG. 9A is a snap-shot on a display screen illustrating the manner in which a tester selects a specific instance of an object on which a program may be later executed. The tester may select invoke option on the 'inst1' instance (the only instance), and control is automatically transferred to FIG. 9B, in which all the programs are listed.

Figure 9B:
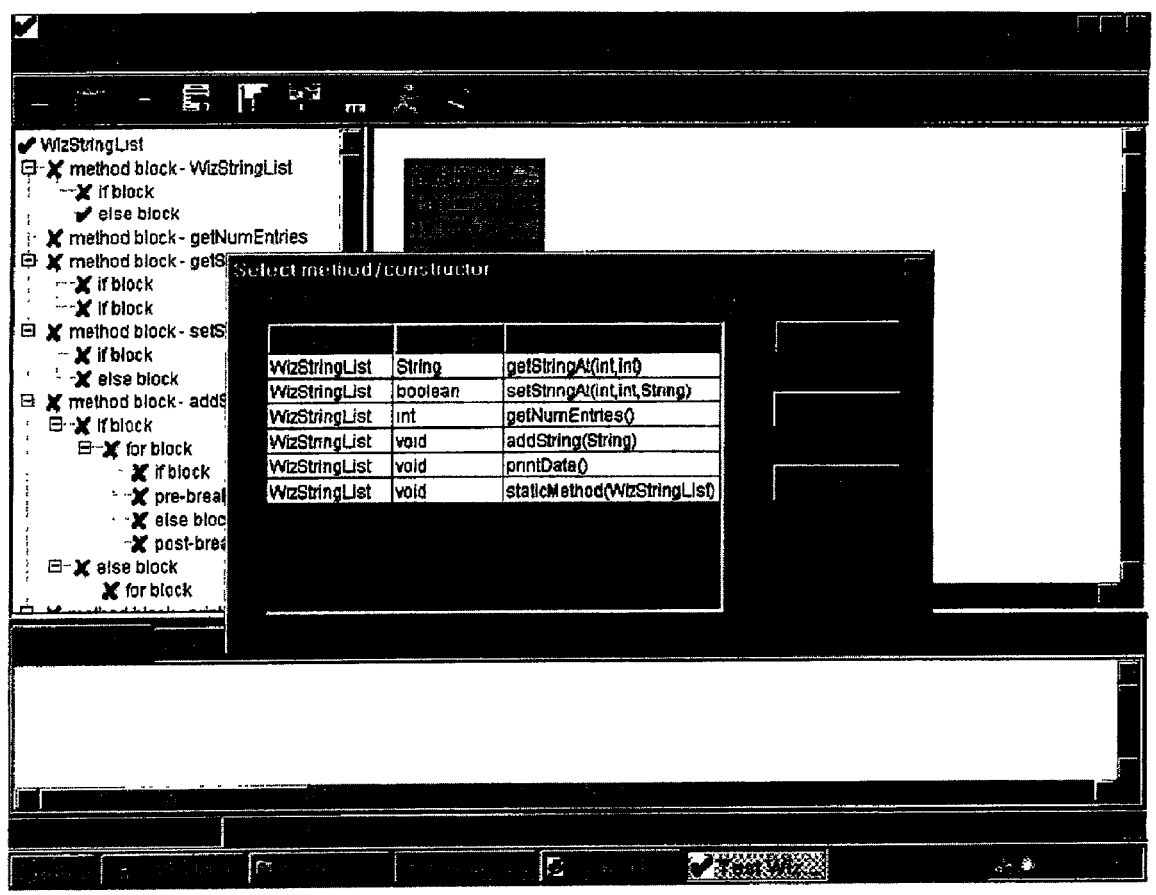
FIG. 9B illustrates the manner in which a tester may select a specific program may be executed on the object instantiated in FIG. 9A.
Figure 9C:
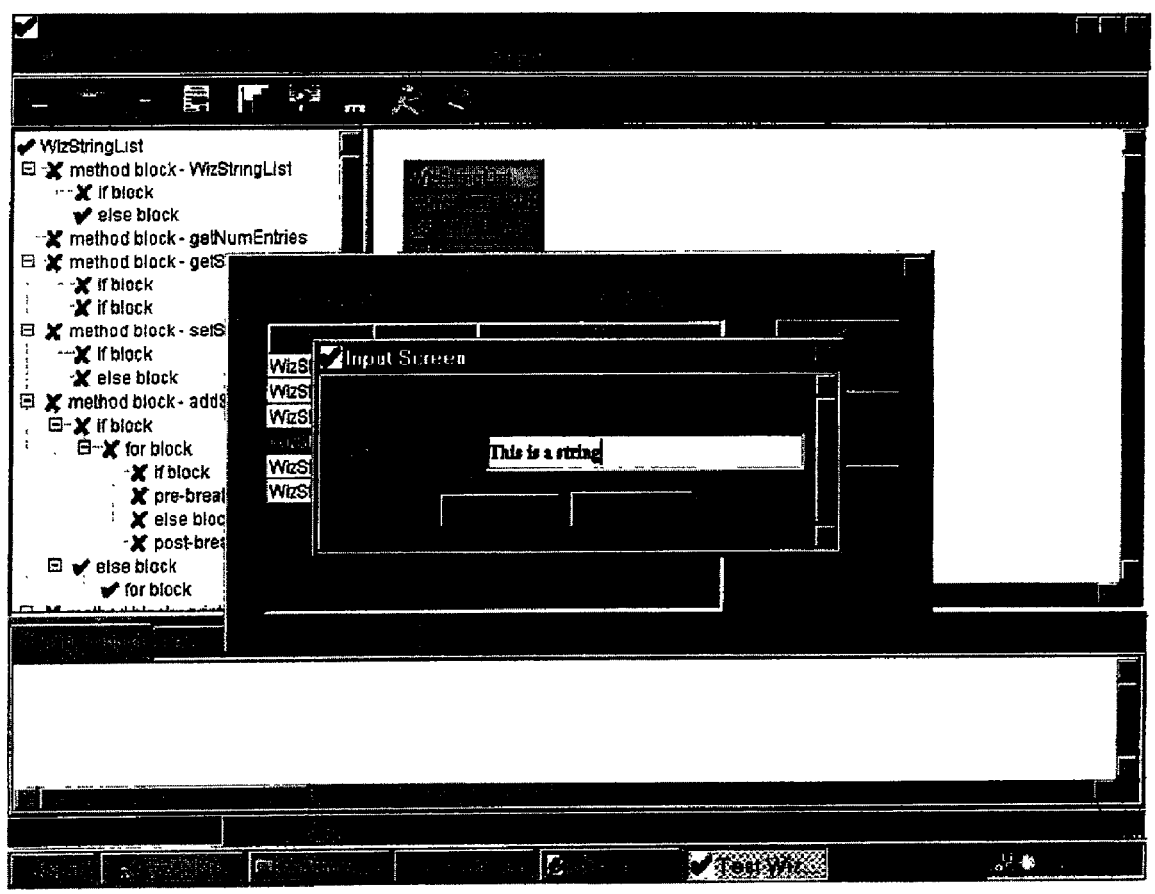
FIG. 9C illustrates the manner in which a tester may provide a desired argument value when executing a program.

In FIG. 9B, the tester selects the specific program to be executed and control is transferred to FIG. 9C, in which the tester may provide a desired argument value. To cause the execution of the IF block of the example of FIG. 8, the tester may provide a number 0 to cause the unexecuted IF block to be executed.

Figure 9D:
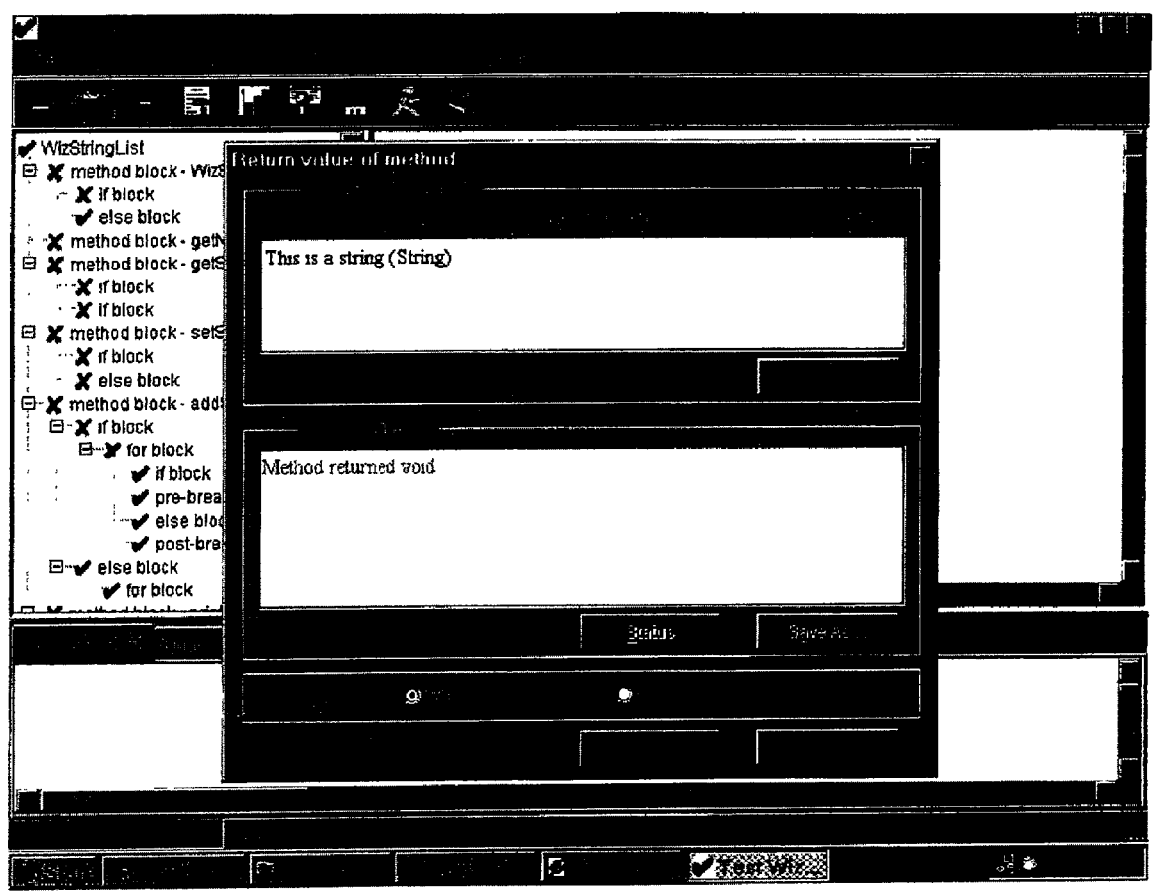
FIG. 9D is a snap-shot of screen displaying the result of execution of the program of FIG. 9B.

The value returned by the execution of the program may be immediately displayed as depicted in FIG. 9D. The tester may indicate whether the execution should be considered a failure or as pass, and the corresponding result is logged in log files 376.

11. Passing a Class Instance as a Parameter/Argument

In general, the class which is to be passed as an argument, needs to be first instantiated and any necessary programs executed. The results are to be stored and provided as arguments to another program. It may be noted that the class provided as an argument need not be instrumented, and just the corresponding executable code (without source code) is sufficient.

Figure 10:
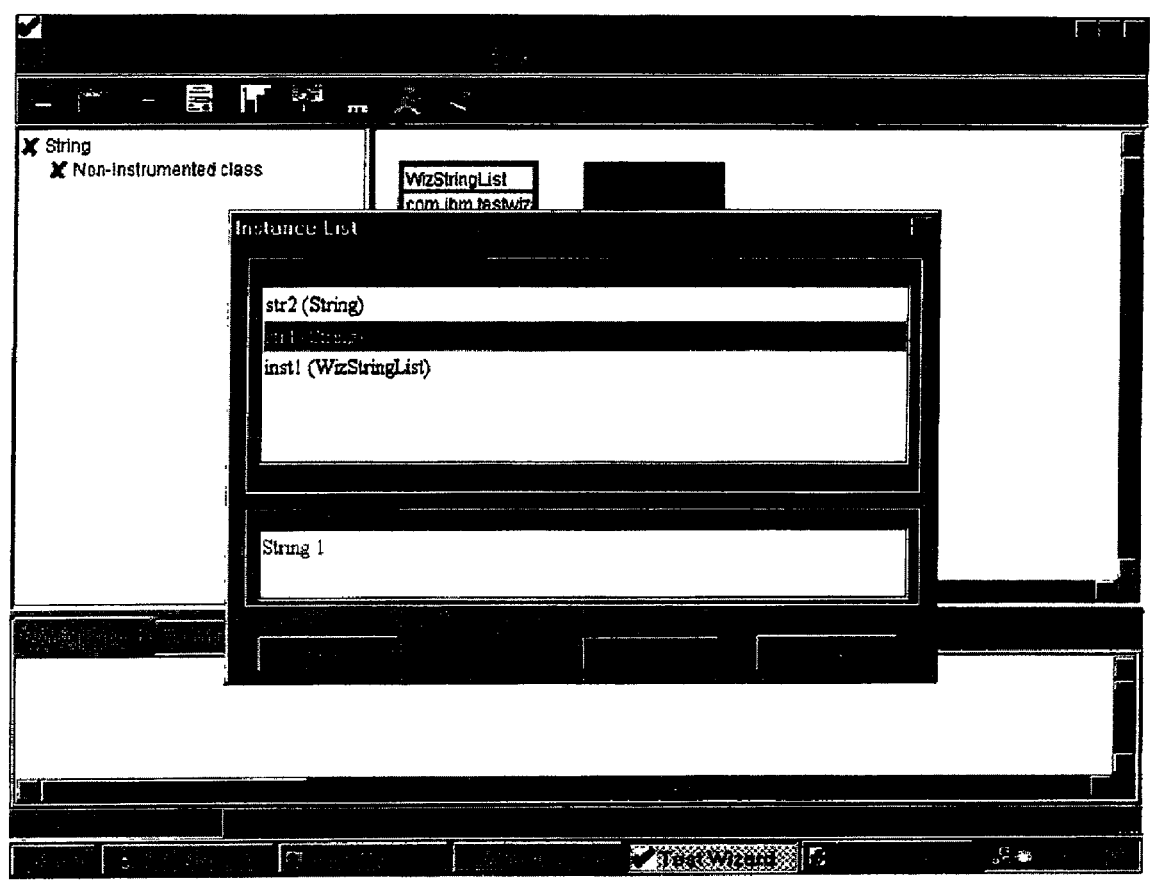
FIG. 10 is a snap-shot of a screen displaying the manner in which a tester may view all the instances of classes presently available for passing as an argument value for a program to be executed.

Thus, a tester may create an instance of a class, for example, as described above with reference to FIGS. 7A-7C. All the instances of all classes may be displayed, for example, as shown in FIG. 10. There are shown three instances str2 and str1 of class String, and inst1 of class WizStringList. The details of three instances and the manner in which the variables within the instances may have been set, are not described as not being necessary for an understanding of the present invention. However, it should be appreciated that the instances may be operated upon just as any other class instances.

It shall hypothetically be assumed that the tester wishes to pass str1 instance as an argument to a program. In one embodiment, the tester merely enters 'str1' (instead of "This is a String") in response to a request for input as requested in FIG. 9C. Testing module 360 compares entered value with all the stored instances (shown in FIG. 10), and determines that the tester intended an instance as an input if the input matches (equals) the name of any instance. If the input type is determined to be an instance, the instance is passed as an argument.

It should be appreciated that other conventions may be employed to conveniently determine whether a tester provided the name of an instance or a string/text input. For example, the tester may be expressly forced to specify the type of input expressly (instead of impliedly as in the example of the preceding paragraph). Thus, a tester may provide an instance of an object as an argument in accordance with an aspect of the present invention.

Another requirement with typical testing systems is that the tester may need the ability to execute a small piece of code in the middle of testing class(es). The code may be used, for example, to examine different variables of complex classes. The manner in which a tester may execute small pieces of code provided in the form of macros is described below.

12. Macros

Figure 11A:
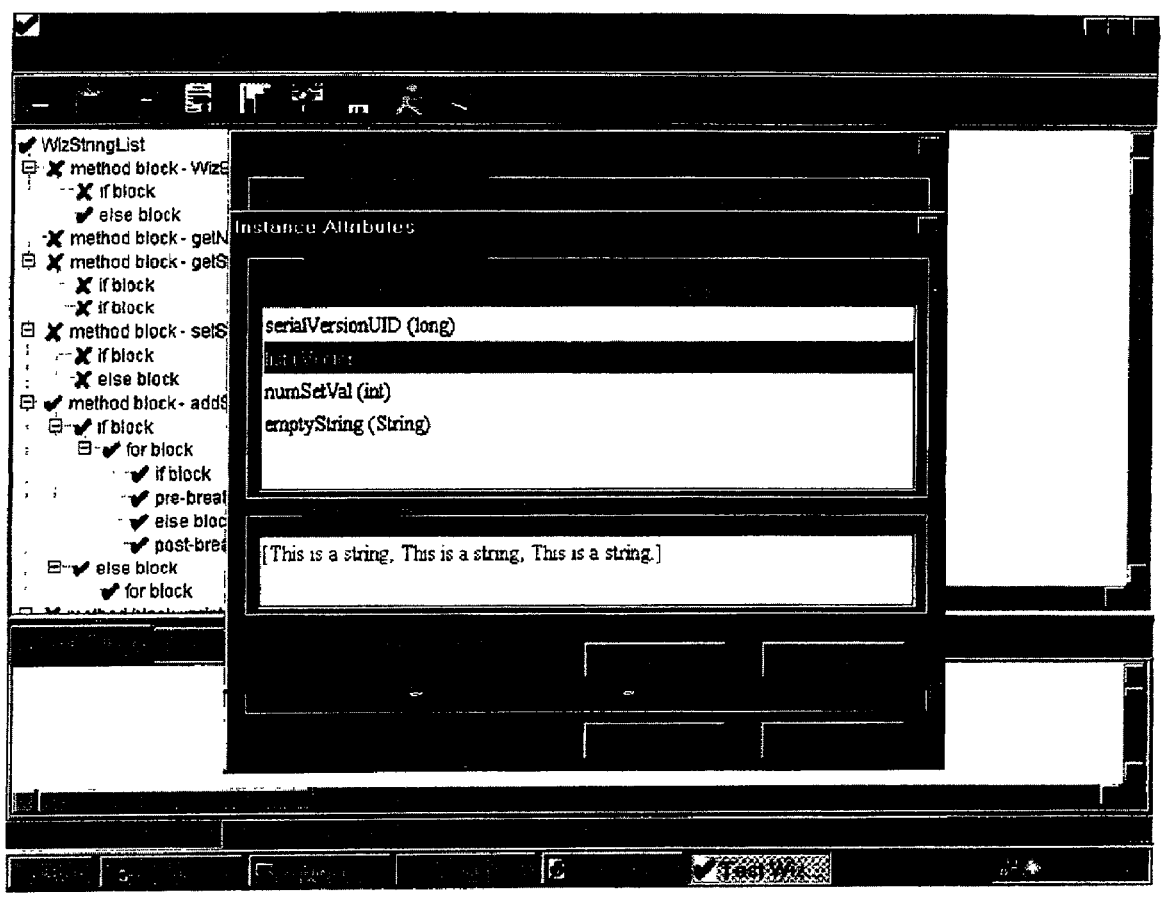
FIG. 11A is snap-shot of a screen displaying the attributes of an instance of a class.

For illustration, it will be assumed that instance inst1 (introduced above) has the attributes shown in FIG. 11A. The instance is shown containing a variable entitled 'list' of the type vector. It may be desirable to print the elements of the vector list. An aspect of the present invention enables a tester to write and execute a macro to achieve a desired purpose (such as printing or 'populating' the variables in instances of objects).

The tester (or even a developer) may first need to specify a class to which the macro is to be directed. Thus, with reference to FIG. 11B, the tester may select the Macro option (on the bar at the top) while WizStringList is highlighted. The tester can then enter the program lines for the macro. The program lines typically need to be provided according to a pre-specified convention.

Figure 11B:
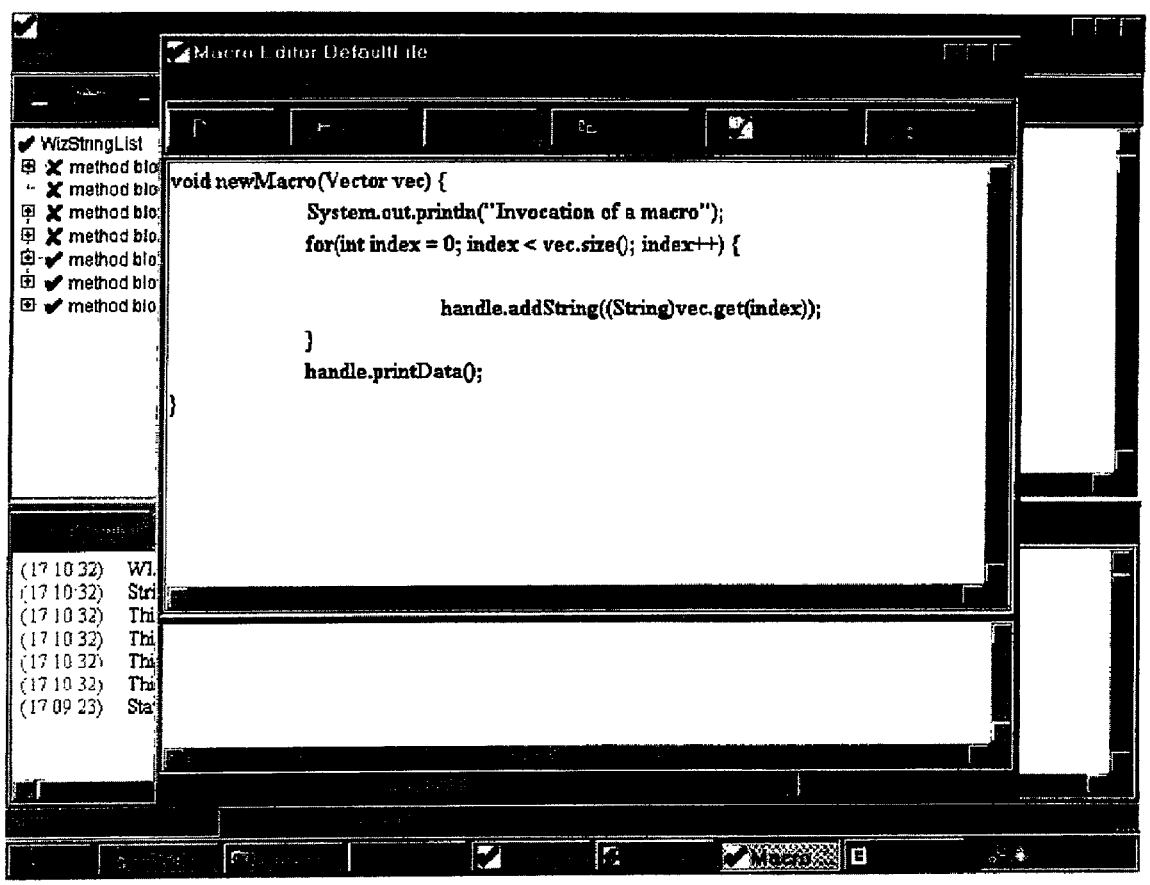
FIG. 11B is a snap-shot of a screen illustrating the manner in which a macro can be defined according an aspect of the present invention.

According to a convention employed in association with FIG. 11B, a reserved variable 'handle' points to the instance on which the macro is later invoked. As may be appreciated, the code of the macro is shown written in Java programming language. The pointer may be maintained by macro handling module 365. Thus, when the tester later selects the specific instance on which the macro is executed, the variable handle is caused to point to the selected variable.

Figure 11C:
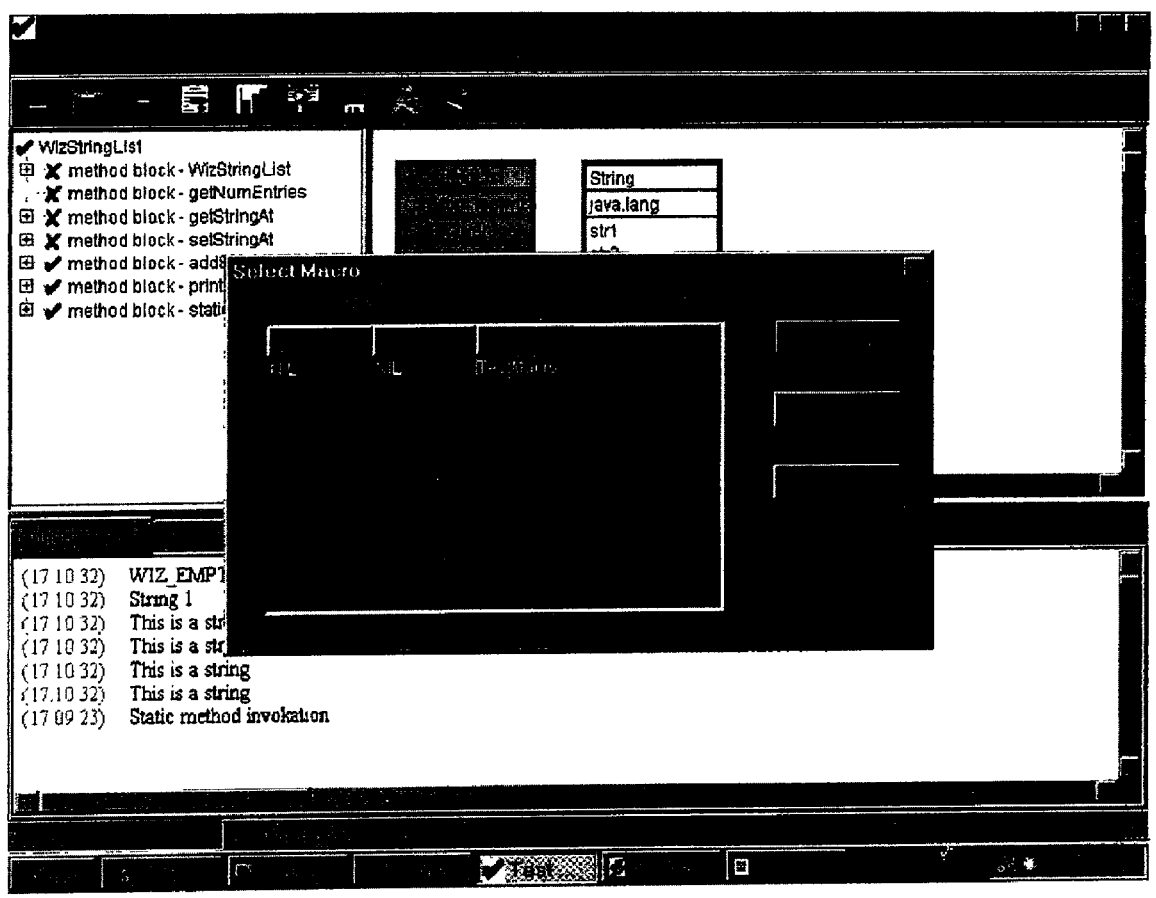
FIG. 11C is a snap-shot of a screen illustrating the manner in which a pre-defined macro can be selected and executed.

A tester may then be provided a pop-up menu as shown in FIG. 11C to select from all the available macros. When the macro is initiated, the values in the vector are printed. Similar approach can be used to populate (i.e., set values for variables) a class also, as will be apparent to one skilled in the relevant arts by reading the disclosure provided herein. Other typical scenario where macros can be used include, invoking other programs on a handle. Such other macros are also contemplated to be within the scope and spirit of the present invention. In general, the ability to define and execute macros provides a tester the ability to address the needs of unique situations presented during testing.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

APPENDIX A

```
/**
The method to be invoked to signal the execution of a code block
     @param    className     The class name in which the block was executed.
     @param    blockNumber   The block number in the class that was executed.
*/
public static void trackExecution(String className, int blockNumber) {
     /* Get the handle to the tree buffer */
     WizTreeBuffer treeBuffer = WizInstrClass.getInstance( ).getTreeBuffer( );
     /* Locate the tree for the class passed, it will always be there */
     int numRecords = treeBuffer.getNumRecords( );
     /* Look for the class */
     int index;
     for(index=0;index<numRecords;index++) {
         if(treeBuffer.getString(index,WizInstrGlobalClass.BLOCK_NAME).equals(className)) {
             break;
         }
     }
     /* look for the block */
```

APPENDIX A-continued

```
    if(blockNumber == treeBuffer.getInt(index,WizInstrGlobalClass.BLOCK__NUMBER)) {
    int status = treeBuffer.getInt(index,WizInstrGlobalClass.BLOCK__EXEC__COUNT);
        /* increment and set the value */
        treeBuffer.setInt(index,WizInstrGlobalClass.BLOCK__EXEC__COUNT,status+1);
    }
    else {
        updateBlock(treeBuffer.getBuffer(index,WizInstrGlobalClass.BLOCK__MAP),
blockNumber);
    }
    /* Update the flags */
    if(updateFlags(treeBuffer)) {
treeBuffer.setInt(index,WizInstrGlobalClass.BLOCK__STATUS,WizInstrGlobalClass.BLOCK__EXECUTED;
    }
        treeBuffer.setInt(index,WizInstrGlobalClass.BLOCKS__EXECUTED,count);
}
```

What is claimed is:

1. A method of testing a program having statements, said method comprising:
dividing said program into a plurality of groups such that every statement in the program belongs to at least one of the groups, wherein each of said groups contains a respective sequence of ones of the statements such that all the statements of such a group are executed if at least one statement of said group is executed, and wherein such a group is deemed to be executed if at least one of the statements of the group is executed when the program is executed;
determining the ones of the groups that are executed when said program is executed while testing said program;
indicating unexecuted ones of the groups based on the ones of the groups that were determined in to have been executed in determining the ones of the groups that are executed when said program is executed while testing said program;
enabling a tester to execute said unexecuted groups such that said tester can ensure that all statements in said program are executed at least once; and
inserting an extra statement in each of said groups, wherein execution of such an extra statement enables to identifying an executed one of the groups corresponding to said extra statement in the ones of the groups that are executed when said program is executed while testing said program.

2. The method of claim 1, wherein said program is contained in a plurality of programs, the plurality of programs being contained in a class of an object oriented environment.

3. The method of claim 1, wherein enabling a tester to execute said unexecuted groups such that said tester can ensure that all statements in said program are executed at least once comprises:
enabling said tester to examine the statements associated with said unexecuted blocks such that said tester can determine arguments for causing an unexecuted block to be executed;
enabling said tester to enter said determined arguments for causing said unexecuted block to be executed.

4. The method of claim 3, wherein such an argument comprises an instance of an object.

5. The method of claim 4, further comprising:
enabling said tester to instantiate said instance of said object;
enabling said tester to assign a name to said instance and enter said name to provide said instance as an argument value.

6. The method of claim 4, further comprising:
receiving a string as an argument; and
determining that said string indicates that said instance is said argument value if said name matches said string.

7. A computer system comprising:
a processor; and
a storage device connected to the processor, wherein the storage device has stored thereon a testing program for controlling the processor, and wherein the processor is operative to execute instructions of the program to implement a method comprising:
a) dividing said program into a plurality of groups such that every statement in the program belongs to at least one of the groups, wherein each of said groups contains a respective sequence of ones of the statements such that all the statements of such a group are executed if at least one statement of said group is executed, and wherein such a group is deemed to be executed if at least one of the statements of the group is executed when the program is executed;
b) determining the ones of the groups that are executed when said program is executed while testing said program;
c) indicating unexecuted ones of the groups based on the ones of the groups that were determined to have been executed in determining the ones of the groups that are executed when said program is executed while testing said program;
d) enabling a tester to execute said unexecuted groups such that said tester can ensure that all statements in said program are executed at least once; and
e) inserting an extra statement in each of said groups, wherein execution of such an extra statement enables identifying an executed one of the groups corresponding to said extra statement in determining the ones of the groups that are executed when said program is executed while testing said program.

8. The computer system of claim 7, wherein said program is contained in a plurality of programs, the plurality of programs being contained in a class of an object oriented environment.

9. The computer system of claim 7, wherein said extra statements contain respective group identifiers, wherein said determining in b) further comprises:
examining such a group identifier to determine a specific one of the groups which has been executed.

10. The computer system of claim 7, wherein enabling a tester to execute said unexecuted groups such that said tester can ensure that all statements in said program are executed at least once comprises:

enabling said tester to examine the statements associated with said unexecuted blocks such that said tester can determine arguments for causing an unexecuted block to be executed;

enabling said tester to enter said determined arguments for causing said unexecuted block to be executed.

11. The computer system of claim 10, wherein such an argument comprises an instance of an object.

12. The computer system of claim 11, wherein the method implemented by the computer executing the instructions of the program comprises:

enabling said tester to instantiate said instance of said object;

enabling said tester to assign a name to said instance and enter said name to provide said instance as an argument value.

13. The computer system of claim 11, wherein the method implemented by the computer executing the instructions of the program comprises:

receiving a string as an argument; and determining that said string indicates that said instance is said argument value if said name matches said string.

14. A computer program product, stored on a computer readable medium, for testing a target program, the computer program product having instructions for execution by a computer, wherein the instructions, when executed by the computer, cause the computer to implement a method comprising:

dividing said target program into a plurality of groups such that every statement in the target program belongs to at least one of the groups, wherein each of said groups contains a respective sequence of ones of the statements such that all the statements of such a group are executed if at least one statement of said group is executed, and wherein such a group is deemed to be executed if at least one of the statements of the group is executed when the target program is executed;

determining the ones of the groups that are executed when said target program is executed while testing said target program;

indicating unexecuted ones of the groups based on the ones of the groups that were determined to have been executed in determining the ones of the groups that are executed when said target program is executed while testing said target program;

enabling a tester to execute said unexecuted groups such that said tester can ensure that all statements in said target program are executed at least once; and inserting an extra statement in each of said groups, wherein execution of such an extra statement enables identifying an executed one of the groups corresponding to said extra statement in determining the ones of the groups that are executed when said target program is executed while testing said target program.

15. The computer program product of claim 7, wherein said target program is contained in a plurality of programs, the plurality of programs being contained in a class of an object oriented environment.

16. The computer program product of claim 7, wherein said extra statements contain respective group identifiers, wherein said determining in the ones of the groups that are executed when said program is executed while testing said program further comprises:

examining such a group identifier to determine a specific one of the groups which has been executed.

17. The computer program product of claim 7, wherein enabling a tester to execute said unexecuted groups such that said tester can ensure that all statements in said program are executed at least once comprises:

enabling said tester to examine the statements associated with said unexecuted blocks such that said tester can determine arguments for causing an unexecuted block to be executed;

enabling said tester to enter said determined arguments for causing said unexecuted block to be executed.

18. The computer program product of claim 10, wherein such an argument comprises an instance of an object.

19. The computer program product of 11, wherein the method implemented by the computer executing the instructions of the computer program product comprises:

enabling said tester to instantiate said instance of said object;

enabling said tester to assign a name to said instance and enter said name to provide said instance as an argument value.

20. The computer program product of claim 11, wherein the method implemented by the computer executing the instructions of the computer program product comprises:

receiving a string as an argument; and determining that said string indicates that said instance is said argument value if said name matches said string.

* * * * *

UNITED STATES PATENT AND TRADEMARK OFFICE
CERTIFICATE OF CORRECTION

| | | |
|---|---|---|
| PATENT NO. | : 8,087,005 B2 | Page 1 of 1 |
| APPLICATION NO. | : 11/876742 | |
| DATED | : December 27, 2011 | |
| INVENTOR(S) | : Pal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1005 days.

This patent is subject to a terminal disclaimer. --

Signed and Sealed this
Sixth Day of March, 2012

David J. Kappos
*Director of the United States Patent and Trademark Office*